United States Patent
Lehmann et al.

(10) Patent No.: US 10,789,119 B2
(45) Date of Patent: Sep. 29, 2020

(54) DETERMINING ROOT-CAUSE OF FAILURES BASED ON MACHINE-GENERATED TEXTUAL DATA

(71) Applicant: ServiceNow, Inc., Santa Clara, CA (US)

(72) Inventors: Yaron Lehmann, Tel Aviv (IL); Gabby Menahem, Petach Tikva (IL); Dror Mann, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 140 days.

(21) Appl. No.: 15/499,060

(22) Filed: Apr. 27, 2017

(65) Prior Publication Data

US 2018/0039529 A1 Feb. 8, 2018

Related U.S. Application Data

(63) Continuation-in-part of application No. 15/228,272, filed on Aug. 4, 2016.

(51) Int. Cl.
*G06F 11/00* (2006.01)
*G06F 11/07* (2006.01)

(52) U.S. Cl.
CPC ........ *G06F 11/079* (2013.01); *G06F 11/0775* (2013.01)

(58) Field of Classification Search
CPC . G06F 11/079; G06F 11/0769; G06F 11/0775
See application file for complete search history.

(56) References Cited

U.S. PATENT DOCUMENTS

| | | |
|---|---|---|
| 5,787,234 A | 7/1998 | Molloy |
| 6,367,034 B1 | 4/2002 | Novik et al. |
| 7,076,543 B1 | 7/2006 | Kirti et al. |
| 8,447,722 B1 | 5/2013 | Ahuja et al. |
| 9,037,896 B2 * | 5/2015 | Addepalli ............. H04L 41/064 714/4.1 |
| 9,043,332 B2 | 5/2015 | Noel et al. |
| 9,294,631 B1 * | 3/2016 | Cogan ................... H04M 15/70 |
| 9,972,103 B2 | 5/2018 | Alves et al. |
| 9,992,220 B2 | 6/2018 | Coates et al. |
| 9,996,409 B2 | 6/2018 | Chen et al. |

(Continued)

OTHER PUBLICATIONS

No stated author; Symantec™ Control Compliance Suite 11.0 User Guide; 2012; Retrieved from the Internet https://www.scribd.com/document/126556709/CCS-User-Guide; pp. 1-952, as printed. (Year: 2012) (Year: 2012).*

(Continued)

*Primary Examiner* — Christopher S McCarthy
(74) *Attorney, Agent, or Firm* — Fletcher Yoder PC

(57) ABSTRACT

A method and system for determining root-causes of incidences using machine-generated textual data. The method comprises receiving machine-generated textual data from at least one data source; classifying the received machine-generated textual data into at least one statistical metric; processing the statistical metric to recognize a plurality of incidence patterns; correlating the plurality of incidence patterns to identify at least a root-cause of an incidence that occurred in a monitored environment; and generating an alert indicating at least the identified root-cause.

32 Claims, 7 Drawing Sheets

(56) References Cited

U.S. PATENT DOCUMENTS

| | | | |
|---|---|---|---|
| 10,007,717 B2 | 6/2018 | Zhang et al. | |
| 10,015,185 B1 | 7/2018 | Kolman et al. | |
| 10,021,127 B2 | 7/2018 | DiValentin et al. | |
| 10,021,138 B2 | 7/2018 | Gill et al. | |
| 10,037,238 B2* | 7/2018 | Bikumala | G06F 11/079 |
| 10,043,006 B2 | 8/2018 | Puri et al. | |
| 10,050,917 B2 | 8/2018 | Alperovitch et al. | |
| 10,051,010 B2 | 8/2018 | Carver et al. | |
| 10,055,477 B2 | 8/2018 | Nojima | |
| 10,057,285 B2 | 8/2018 | Choudhary et al. | |
| 10,061,805 B2* | 8/2018 | Tidwell | G06F 16/2455 |
| 10,063,570 B2 | 8/2018 | Muddu et al. | |
| 10,102,054 B2* | 10/2018 | Wolf | G06F 11/079 |
| 10,169,122 B2 | 1/2019 | Tee et al. | |
| 10,311,067 B2 | 6/2019 | Chen et al. | |
| 2003/0004966 A1 | 1/2003 | Bolle et al. | |
| 2003/0149586 A1* | 8/2003 | Chen | G06Q 10/063 705/7.11 |
| 2005/0060295 A1 | 3/2005 | Gould et al. | |
| 2005/0080806 A1 | 4/2005 | Doganata et al. | |
| 2006/0095521 A1 | 5/2006 | Patinkin | |
| 2007/0214164 A1 | 9/2007 | MacLennan et al. | |
| 2007/0220063 A1 | 9/2007 | O'Farrell et al. | |
| 2010/0017487 A1 | 1/2010 | Patinkin | |
| 2010/0057677 A1 | 3/2010 | Rapp et al. | |
| 2010/0125911 A1 | 5/2010 | Bhaskaran | |
| 2010/0312522 A1 | 12/2010 | Laberge et al. | |
| 2010/0312769 A1 | 12/2010 | Bailey et al. | |
| 2012/0062574 A1 | 3/2012 | Dhoolia et al. | |
| 2012/0150859 A1 | 6/2012 | Hu | |
| 2012/0197896 A1 | 8/2012 | Li et al. | |
| 2013/0097701 A1 | 4/2013 | Moyle et al. | |
| 2013/0262656 A1 | 10/2013 | Cao et al. | |
| 2013/0268839 A1 | 10/2013 | Lefebvre et al. | |
| 2013/0311481 A1* | 11/2013 | Bhatt | G06F 16/2228 707/741 |
| 2014/0095425 A1 | 4/2014 | Sipple | |
| 2014/0129536 A1* | 5/2014 | Anand | G06Q 10/0635 707/706 |
| 2014/0324862 A1 | 10/2014 | Bingham et al. | |
| 2015/0278823 A1* | 10/2015 | Kushnir | G06F 16/35 705/304 |
| 2015/0370799 A1 | 12/2015 | Kushmerick et al. | |
| 2016/0034525 A1* | 2/2016 | Neels | G06F 16/285 707/737 |
| 2016/0065594 A1 | 3/2016 | Srivastava et al. | |
| 2017/0063896 A1 | 3/2017 | Muddu et al. | |
| 2017/0075744 A1 | 3/2017 | Deshpande et al. | |
| 2017/0272458 A1 | 9/2017 | Muddu et al. | |
| 2018/0115464 A1* | 4/2018 | Fighel | H04L 9/3226 |
| 2018/0146000 A1 | 5/2018 | Muddu et al. | |
| 2018/0157762 A1 | 6/2018 | Tee | |
| 2018/0159880 A1 | 6/2018 | Sood et al. | |
| 2018/0159885 A1 | 6/2018 | Baum et al. | |
| 2018/0173769 A1 | 6/2018 | Saperstein et al. | |
| 2018/0191754 A1 | 7/2018 | Higbee et al. | |

OTHER PUBLICATIONS

No stated author; Symantec TM Control Compliance Suite 11.0 User Guide; 2012; Retrieved from the Internet : https://www.scribed.com/document/126556709/CCS-User-Guide>; pp. 1-952, as printed. (Year: 2012).

Introduction to ARIMA models, url: http://people.duke.edu/~mau/411arim.htm.

Wikipedia definition for Grubbs' Test, Retrieved from "https://en.wikipedia.org/w/index.php?title=Grubbs%27_test_for_outliers&oldid=720201233", page last edited May 14, 2016.

Wikipedia definition of AdaBoost, Retrieved from "https://en.wikipedia.org/w/index.php?title=AdaBoost&oldid=768996379", page last edited Mar. 6, 2017.

Wikipedia definition of Fournier transform, Retrieved from "https://en.wikipedia.org/w/index.php?title=Fourier_transform&oldid=778201678", Page last edited on May 1, 2017.

Wikipedia definition of Hidden Markov model, Retrieved from "https://en.wikipedia.org/w/index.php?title=Hidden_Markov_model&oldid=778214092", page last edited on May 1, 2017.

Wikipedia definition of Kolmogorov-Smirnov test, Retrieved from "https://en.wikipedia.org/w/index.php?title=Kolmogorov-Smirnov_test&oldid=776209221", Page last edited on Apr. 19, 2017.

Wikipedia definition of Mann-Whitney U test, Retrieved from "https://en.wikipedia.org/w/index.php?title=Mann-Whitney_U_test&oldid=778009689", Page last edited on Apr. 30, 2017.

Bitincka, et al., "Optimizing Data Analysis with a Semi-structured Time Series Database", 2010, pp. 1-9, url: https://www.usenix.org/legacy/event/slaml10/tech/full_papers/Bitincka.pdf.

Carasso, "Exploring Splunk", 2012, pp. 1-156, url: https://www.splunk.com/pdfs/exploring-splunk.pdf.

* cited by examiner

DETERMINING ROOT-CAUSE OF FAILURES BASED ON MACHINE-GENERATED TEXTUAL DATA

CROSS-REFERENCE TO RELATED APPLICATIONS

This application is a continuation-in-part of U.S. patent application Ser. No. 15/228,272 filed on Aug. 4, 2016, the contents of which are hereby incorporated by reference.

TECHNICAL FIELD

The present disclosure generally relates to root-cause analysis of incidences using machine-generated data.

BACKGROUND

The amount of data generated by various machines (e.g., appliances, servers, software tools, etc.) connected in an organization is enormous. The machine-generated data may be in a structured textual format, an unstructured textual format, or a combination thereof. Examples for such machine-generated textual data include logs, metrics, configuration files, messages, spreadsheets, events, alerts, sensory signals, audit records, database tables, and so on. The various machines in an enterprise are typically from multiple different vendors and, thus, even if the data from each vendor is in a structured format, that data is not typically unified across different vendors. Additionally, machine-generated textual data is not in a natural language that can be read and understood by humans, as machines are currently not adapted to recognized such data.

The vast amount of machine-generated textual data requires information technology (IT) personnel to effectively review, analyzed and response to countless unwanted emails, messages, notifications, and the like to identify a specific malfunction. The ability of a person (e.g., an IT administrator) to react to such high volumes of data is limited by the rate of processing of the person. Further, the high volume of data decreases productivity and delays detection of critical issues, as not all data can be processed by the person.

Moreover, a user that needs to process such large volumes of data may wish to gain visibility as to the performance of the entire IT systems in the enterprises and determine a root-cause for reported malfunction. To determine the causality between reported alerts data received from different domains (e.g., network, infrastructure, and application) should be processed. Each such domain has its own domain-expert. Thus, the challenge of determining the root-cause of each incident is amplified. For example, the machine-generated textual data may include readings indicative of a high-CPU utilization and security logs indicative of new viruses. Currently, IT personnel have no effective way to determine any causality between these reported inputs.

Existing solutions cannot resolve the deficiencies noted above, as such solutions operate in silos. That is, the creation of machine-generated textual data and reading of such data are performed by different solutions (components), which are not necessarily developed by the same vendors. Furthermore, some existing solutions for digital events-ingestion merely aggregate machine-generated data and provide search capabilities across the aggregated data. Other solutions are limited to processing a specific set of textual data generated by common tools. However, such solutions typically do not cover the entire spectrum of machines installed in an organization and are not adapted to cover the entire set of logs, events, and other data generated by the machines. Therefore, meaningful and important information may not be detected or otherwise analyzed by such solutions.

Existing solutions fail to detect a root-cause and its symptoms of a malfunction. A malfunction can be a system error or failure, an application error, and the like. This deficiency is largely due to at least the following challenges: the need to query multiple data-sources storing data in different structures at the same time; the structure of machine-generated data not being standardized; the data being formatted with the intention that the data is to be ingested by a human rather than a computer; the machine-generated data including a mixture of the original events, wrapped with unrelated additional information (e.g., Syslog transport headers added by relay servers); and the same data being serialized in several formats (e.g. JSON, XML).

As a result of the deficiencies of existing solutions, machine-generated textual data is often analyzed by humans. Of course, any manual analysis is prolonged, requires human resources, and affects the overall performance of the enterprise. A major drawback of this approach is that the amount of data that can be processed by users such as IT personnel is limited by restraints on human resources. Due to the size, variety, retention, and dynamic nature of machine-generated data that continues to grow, a manual approach for solving the above-noted tasks is inefficient.

In addition to the above limitations, current solutions generate alerts based on rules or thresholds set by the IT personnel. During typical operation, such rules and thresholds often result in a flood of alerts of different sensitivities. As a result, many alerts are ignored or overlooked. Further, the generated alerts typically do not include information on the root-cause of the problem that triggered an alert or recommendations how to solve the detected indecent.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for determining root-causes of incidences using machine-generated textual data. The method comprises receiving machine-generated textual data from at least one data source; classifying the received machine-generated textual data into at least one statistical metric; processing the statistical metric to recognize a plurality of incidence patterns; correlating the plurality of incidence patterns to identify at least a root-cause of an incidence that occurred in a monitored environment; and generating an alert indicating at least the identified root-cause.

Some embodiments disclosed herein include a system for determining root-causes of incidences using machine-generated textual data. The system comprises a processing circuit; a memory communicatively connected to the processing circuit, wherein the memory contains instructions that, when executed by the processing element, configure the processing circuit to: receive machine-generated textual data from at least one data source; classify the received machine-generated textual data into at least one statistical metric; process the statistical metric to recognize a plurality of incidence patterns; correlate the plurality of incidence patterns to identify at least a root-cause of an incidence that occurred in a monitored environment; and generate an alert indicating at least the identified root-cause.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
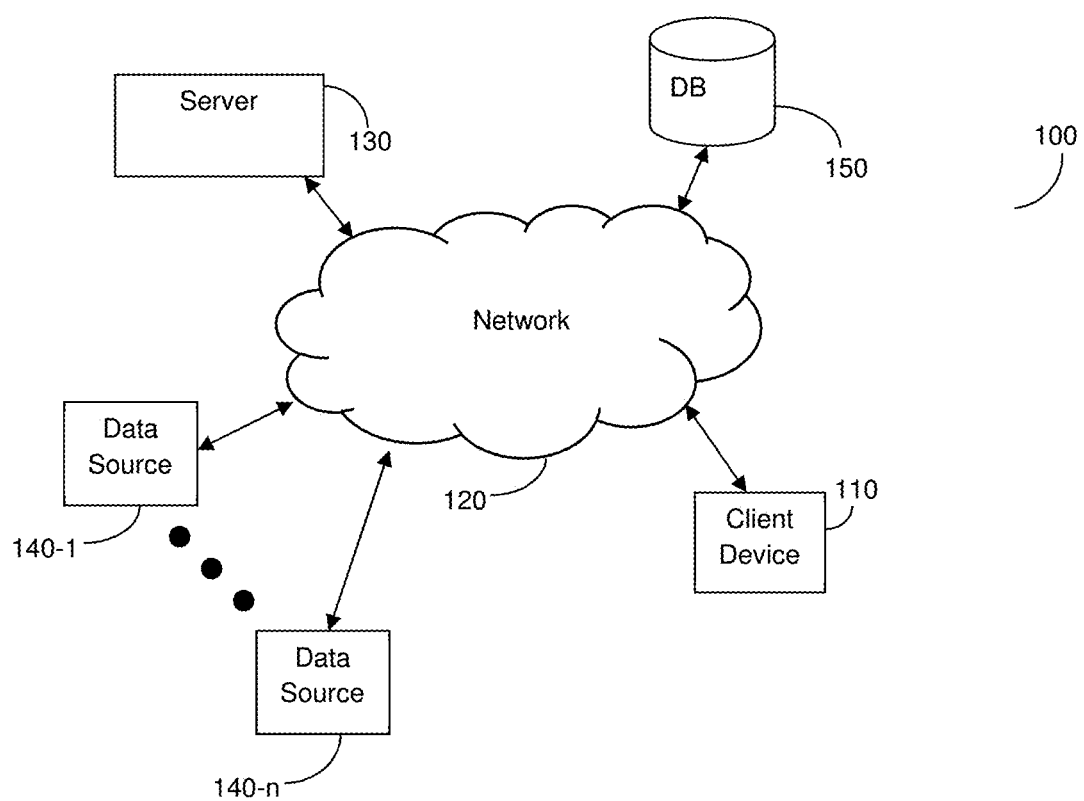
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments disclosed herein include a method and system for detecting the root-cause of incidences based on machine-generated textual data provided by different sources. Incidences may include failures, malfunctions, and the like of any resource in a monitored environment. As will be discussed in more detail below, in an embodiment, the root-cause analysis is performed by aggregating and correlating potential incidence patterns. In certain embodiments, the determined root-cause can be utilized to reduce the number of alerts triggered in response to detection of incidences, and for prioritization of such alerts. In an embodiment, the machine-generated textual data is collected from one or more data sources. The collected data is reconstructed and classified into different statistical metrics. The statistical metrics may include, for example, a gauge, a meter, and a histogram.

FIG. 1 shows an example network diagram 100 utilized to describe the various disclosed embodiments. The network diagram 100 includes a client device 110, a network 120, a server 130, and a plurality of data sources 140-1 through 140-$n$ (hereinafter referred to individually as a data source 140 and collectively as data sources 140, merely for simplicity purposes). In some embodiments, the network diagram 100 further includes a database 150 communicatively connected to the network 120 and utilized to store machine-generated textual data, events processed based on machine-generated textual data, and the classification results.

The client device 110 may be operated by a user (e.g., a system administrator) to control the operation of the server 130, view alerts, detected incidences, and so on. The network 120 may be, but is not limited to, a local area network (LAN), a wide area network (WAN), the Internet, a wired network, a wireless network, similar networks, and the like, as well as any combination thereof.

Each of the data sources 140 generates machine-generated textual data. The data sources 140 may be different machines, systems, or software tools operable in an organization and configured to monitor, control, and report on issues related to, for example, computing infrastructure of an organization. Examples for the data sources 140 include any IT-based device, such as routers, network appliances, application servers, database servers, sensors, and the like. In general, any virtual or physical computing resource adapted to generate textual data can serve as a data source 140.

The machine-generated textual data generated by the data sources 140 may include, for example, application logs, configuration files, messages, spreadsheets, events, alerts, sensory signals, audit records, and so on. It should be noted that the data sources 140 are different from each other and, thus, the data provided by each source may be of a different format, structure, or both. Furthermore, some of the data sources 140 may output structured data while others may output unstructured data. The machine-generated textual data provided by the data sources 140 may be standardized or not-standardized.

The machine-generated textual data may be encapsulated in CSV files, JSON files, XML files, plain text files, and so on. Such files can be pulled by the server 130 (from the sources 140), pushed to the server 130, uploaded to the server 130, received at the server 130 through other methods or channels, or a combination thereof. Typically, JSON and XML files are streamed in real-time, while CVS files are uploaded in batches.

In an embodiment, the server 130 is configured to detect the root-cause of incidences. To this end, the server 130 is configured to classify the received machine-generated textual data into a set of statistical metrics. Types of the statistical metrics include, but are not limited to, a histogram, a meter, a gauge, and the like. For example, CPU utilization and page-views may be classified as gauge metrics, purchases may be classified as a histogram metric, and message-clusters and hostnames may be classified as meter metrics.

In addition, the server 130 is configured to output metadata associated with each event in the machine-generated textual data and a schema that can be used to structure the event. The schema allows for performance of various operations on events, such as querying, filtering, manipulating, calculating statistical attributes, or otherwise handling the event or parts of the event.

The server 130 is further configured to process the various portions of an event to identify contextual tokens. Typically, contextual tokens are identified in messages included in the event. A message includes free-text that cannot be categorized as a property and has a length (e.g., number of characters) above a predefined threshold.

The metric utilized to classify events is determined for clusters of events, tokens, key-value pairs, and properties. In an embodiment, the determination of which metric type to associate with each such element is based on the element's type, context, or a combination thereof. That is, for each identified element (e.g., elements such as clusters, tokens, key-value pairs, and properties), it is determined whether the element's value can be statistically measured as any or all of a value distribution (histogram), an appearance rate (meter), or a value range (gauge). In an embodiment, the context of an element can be utilized to determine its statistical value distribution. A metric is a statistical value distribution.

An example classification process is described in more detail in the co-pending U.S. patent application Ser. No. 15/228,272 (hereinafter the '272 Application), assigned to the common assignee. which is hereby incorporated herein by reference.

In an embodiment, the server 130 is configured to recognize incidence patterns by processing the statistical metrics. In a further embodiment, the server 130 is further configured to apply past behavior of each incidence pattern to predict its future behavior. The incidence patterns may include, but are not limited to, new behavior, anomalous behavior, changes in routine operational, ongoing trends, and so on. The incidence pattern recognition may be performed using one or more techniques including, but not limited to, statistical methods (e.g., Grubbs and ARIMA utilized to detect local outliers over different timespans), frequencies analysis to detect deviations from expected seasonal behavior, Hidden Markov Models to pinpoint a transition between normal and abnormal states. Other techniques may include Kolmogorov-Smirnov and U-Test used to identify changes in the basic distribution over time, when such changes are relevant.

In an embodiment, the type of technique utilized to recognize the pattern is based on the metric being processed. In another embodiment, every recognized pattern is further analyzed to determine if an alert should be generated. In an example, the analysis is performed using an AbaBoost technique which results in a yes/no decision.

The recognized incidence patterns are processed to determine a root-cause of an incidence. In an embodiment, a set of "meaningful" incidence patterns from the recognized incidence patterns is processed. To this end, the server 130 is configured to determine which of the recognized incidence patterns are meaningful. In an embodiment, meaningful patterns are determined by considering the amplitude of a pattern, a frequency of a pattern, a similarity of a pattern to previously detected patterns, a number of same or similar recognized patterns, or any combination thereof. An amplitude of a pattern may be, for example, an amplitude of a corresponding anomaly. A frequency of a pattern may be, for example, the number of times the same anomaly was observed during of a predefined time interval. The selection of meaningful incidence patterns improves the processing time and the quality of the analysis.

In most cases, a single root problem is caused by incidence patterns (e.g., anomalous behavior) of different related or unrelated events. This results in numerous alerts being triggered. Thus, detecting the root-cause of an incident would allow for reducing the number of alerts being reported to the user. Further, detecting the root-cause of an incident may allow for grouping of different alerts that were generated simultaneously or near simultaneously. The grouping may be based on the urgency and/or importance of the different alerts. Such grouping would increase the coverage of the entity being tracked and/or monitored.

According to the disclosed embodiments, the server 130 is further configured to determine the root-cause of an incidence by aggregating and correlating at least two recognized incidence patterns. The aggregation may be over a predefined time-period or when there is a sufficient number of recognized patterns.

In one embodiment, the correlation is time-proximity based. That is, two or more incidence patterns resulting from events that occurred at the same or substantially the same time are correlated. In this embodiment, the root-cause is determined to be an incidence observed by an incidence pattern that occurred before other incidence patterns being correlated.

Figure 2:
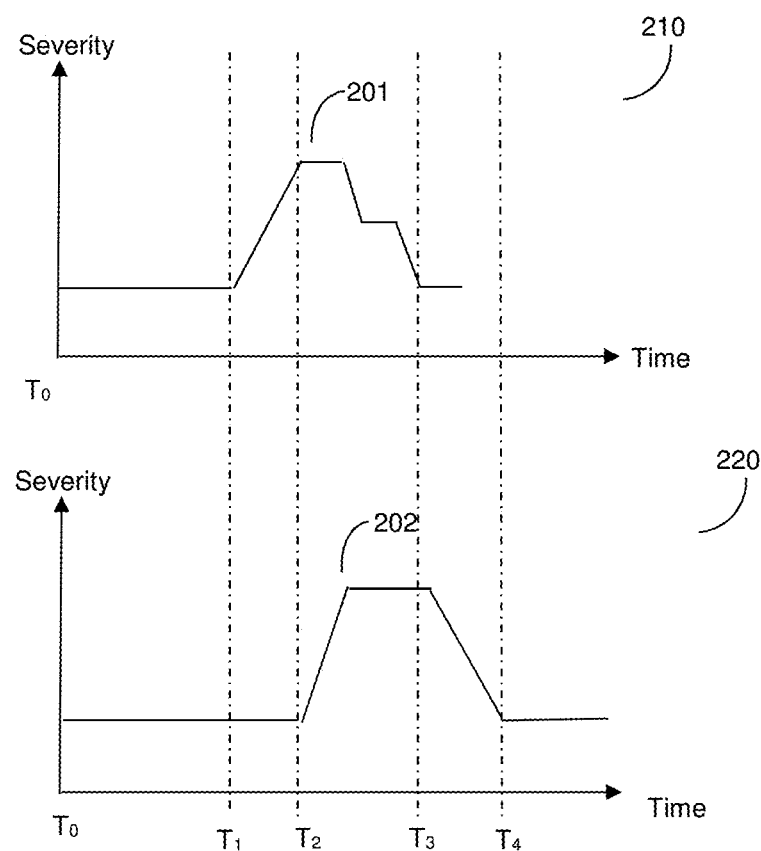
FIG. 2 shows a simulation illustrating a time-proximity based correlation type.

This correlation type is further demonstrated in the example simulation shown in FIG. 2. Graphs 210 and 220 show two incidence patterns 201 and 202, respectively. The pattern 201 demonstrates a normal behavior from $T_0$ to $T_1$ and after $T_3$, and abnormal behavior between $T_1$ and $T_3$. The pattern 202 demonstrates a normal behavior from $T_0$ to $T_2$ and after $T_4$, and abnormal behavior between $T_2$ and $T_4$. In this embodiment, the incidence indicated by the pattern 201 is the root-cause of the incidence indicated by the pattern 202.

As an example, a first incidence pattern occurs due to a gauge metric demonstrating an anomaly resulting from a high CPU utilization. The timestamp associated with the logs generated in response to the high CPU utilization is 00:05. A second incidence pattern occurs due to a meter metric demonstrating an anomaly resulting from a high number of security logs indicative of a newly detected malware. The timestamps associated with the events generated in response to security logs is 00:00-00:12. As the time proximity of these incidence patterns are relatively close, they are determined to be time correlated. The correlation of the patterns would determine that the root-cause of the high CPU utilization is the new malware. It should be noted that the incidence patterns are correlated across many applications and systems, and that the only selection factor in this embodiment is time-based.

In another embodiment, the incidence patterns are correlated based on a certain order. The order may be based on time, severity, or both. This correlation type attempts to identify at least one potential incidence that caused the other potential incidences. This type of correlation is further demonstrated in the example simulation shown in FIG. 3.

The graphs 310, 320, and 330 represent different incidence patterns 301, 302, and 303, respectively. Each of the graphs 310, 320, and 330 further demonstrates the time and severity of each incidence pattern. The severity may be, for example, an amplitude, a frequency, and the like. In this embodiment, the server 230 is configured to detect at least one incidence pattern that causes other incidences to "break". That is, an incidence represented by an incidence pattern trended as an increased, for example, in severity, but has not yet crossed the severity threshold.

Figure 3:
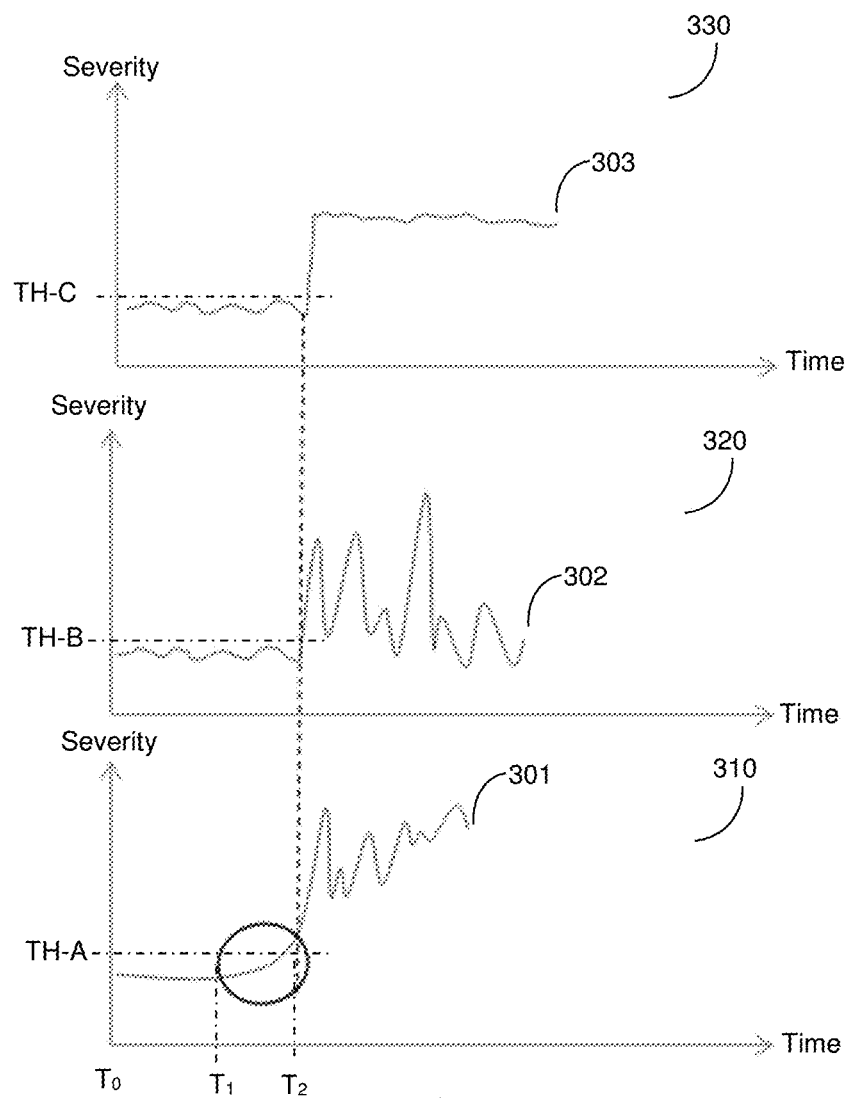
FIG. 3 shows a simulation illustrating an order-based correlation type.

As shown in FIG. 3, at $T_0$, the incidence patterns 301, 302, and 302 are below their respective thresholds TH-A, TH-B, and TH-C. The severity of the pattern 301 gradually increases from $T_1$ to $T_2$, until the threshold level TH-A is crossed. At time $T_2$, all other incidence patterns 302 and 303 cross their respective threshold levels TH-B and TH-C, respectively. Thus, the incidence represented by the incidence pattern 301 broke the incidence patterns 302 and 303. As such, the incidence observed by the pattern 301 is the root-cause of incidences observed by patterns 302 and 303.

As an example, a first incidence pattern occurs due to a storage device having a disk malfunction which does not allow any data writes to the disk. Due to such a malfunction, the storage device would attempt to rewrite (reperform) any write request. As a result, the operation speed of the storage device would be reduced until the device becomes unresponsive. When the storage device ceases operation, any service writing to the storage device would also be unresponsive. Thus, the alert would be generated for each unresponsive service.

In this example, the incidence patterns are meter metrics resulting from error messages generated by the storage device and each service writing to the device. The incidence patterns all become broken when the storage device ceases operation. Thus, the correlation results in determining the root-cause of the unresponsive service to be the storage device with a malfunction disk.

In another embodiment, the root-cause can be determined when there is no certain order or no commonality across the observed potential incidences. In this embodiment, the root-cause is determined based on the potential incidences correlated across different components. A component may be, for example, any group of services, applications, devices, or hardware elements serving the same function. This type of correlation will be discussed with reference to FIG. 4.

Figure 4:
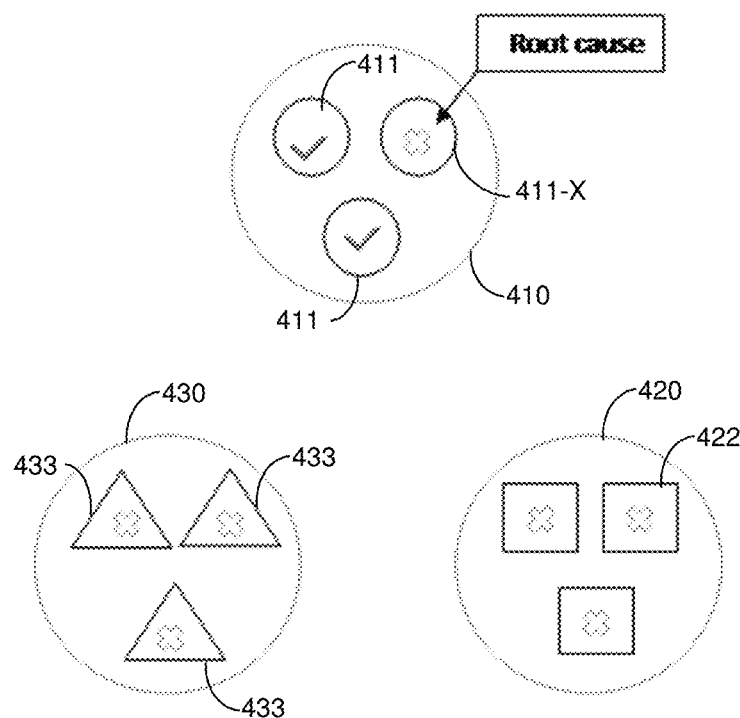
FIG. 4 is a schematic diagram illustrating component-based correlation type according to an embodiment.

FIG. 4 is an example simulation showing 3 different components 410, 420, and 430, each of which represent similar elements 411, 422, and 433, respectively. The incidence patterns of the elements 422 and 433 indicate an incidence (e.g., a failure). In the component 410, the incidence pattern of only element 411-X indicates an incidence, while the other elements are non-incidental. All incidence patterns of all elements are generated based on time proximity. In this embodiment, the root-cause is determined to be the element in a component for which the other elements are not broken. In the example simulation shown in FIG. 4, the element 411-X is the root-cause.

Figure 5:
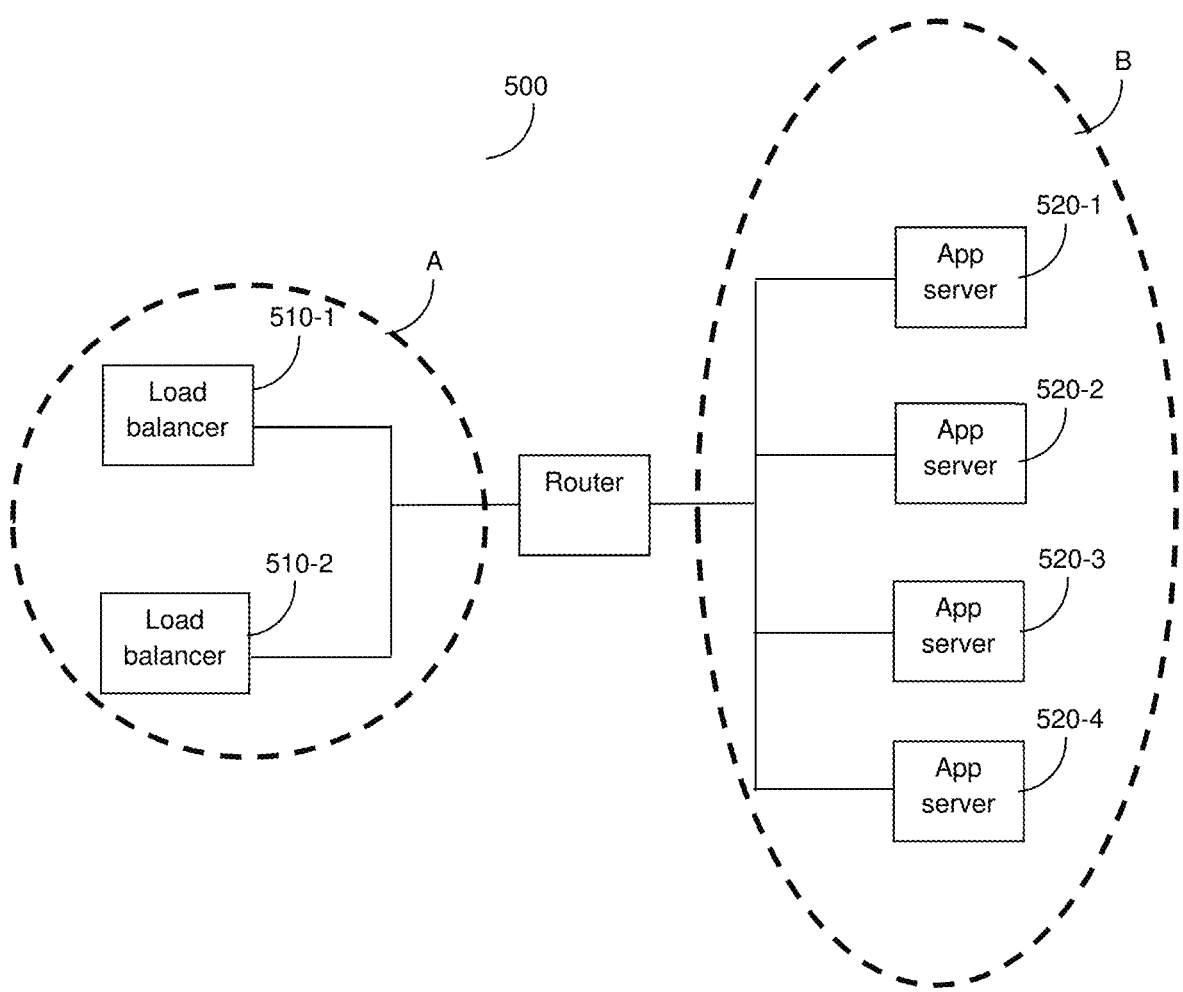
FIG. 5 is a diagram illustrating an IT infrastructure utilized to describe the component-based correlation type.

The component-based correlation type is further discussed in FIG. 5, which shows an IT infrastructure (e.g., a datacenter) 500 including a pair of load balancers 510-1 and 510-2 communicatively connected to a plurality of application (App) servers 520-1 through 520-4. The load balancers 510 and 511 distribute incoming requests (e.g., HTTP requests) to the application servers 520-1 through 520-4. The load balancers 510-1 and 510-2 are grouped as component A, while the application servers 520-1 through 520-4 are grouped as component B.

In this example, the load balancer 510-1 is erroneously configured to distribute all requests to the application servers 520-1 and 520-4. The load balancer 510-2 is properly configured. As a result, the incidence pattern of the load balancer 510-2 is a meter metric due to a bad configuration error message.

The incidence patterns of the application servers 520-1 through 520-4 are gauge metrics indicating high load for the servers 520-1 and 520-4 and low CPU utilization for the servers 520-2 and 520-3. It should be noted that there is no specific order to the generation of incidence patterns and not all patterns resulted from the same metric type. Further, the component A does not demonstrate a potential incidence across all of its elements.

In an embodiment, the incidence patterns are detected approximately at the same time, but not necessarily in any specific order. The root-cause is determined to be in a component if at least some elements of the component report a problem. In this example, the root-cause of the problem in the application severs 520 is the bad configuration in the load balancer 510-1.

It should be noted that, without correlating the incidence patterns as suggested herein, an IT person would typically look for problem at the application servers 520. The user will report problems on the application servers 520 (e.g., cannot access a website or make an online purchase). IT personnel examining logs of the application servers 520 cannot determine if the failure is due to bad configuration of the load balancers 510.

In another embodiment, the detection of a root-cause of is based on tracing certain entities identified in at least one incidence pattern of a detected incidence (anomaly). The identified entities contain meaningful information that would allow detection of the root-cause. Examples for identifiers may include, a machine name or identifier reported a failure, a user identifier, a reason for the failure, timestamp, and so on. The machine identifier may be, for example, a hostname, an IP address, and the like.

The incidence patterns generated prior to the detection of the incidence are scanned to detect entities that are the same or similar to the identified entities. In an embodiment, a predefined time interval is used for the scanning, e.g., only incidence patterns including a timestamp of an hour prior to the detection of the incidence. Any incidence patterns including entities matching the identified entities are correlated to determine the root-cause. In another embodiment, such incidence patterns are displayed to the user on a timeline of their occurrence.

It should be appreciated that as incidence patterns are generated by difference applications and/or sources, the disclosed embodiments allow detection of a cause of an incidence across applications. For example, a cause for a failure of an application may be a firewall that blocked a specific IP address.

In another embodiment, the detection of a root-cause of a single incidence pattern is detected. That is, the root-cause is determined without correlation of two or more incidence patterns. In this embodiment, upon detection of an incidence, machine-generated textual data associated with the respective incidence pattern are gathered. In an embodiment, machine-generated textual data received during a past predefined time window is gathered. For example, all application logs generated in the last hour since the detection of the incidence are gathered. The gathered machine-generated textual data may be classified or unclassified.

The gathered machine-generated textual data is analyzed to detect one or more entities that may cause the incidence. The values of one, some or all of the entities are extracted from the gathered textual data and compared to their respective historic values. A historic value represents at least normal behavior of an entity. Any entity that deviates from its respective value may indicate the root cause of the incidence. The entities to be analyzed may be predetermined.

As an example, a failure in a number of servers installed in a rack cabinet is detected at 22:27. The sensory signals including readings of the temperature in the rack cabinet since 21:27 are gathered and compared to their respective historic values. Higher readings in the temperature since 21:27 would indicate that the root cause is a rack's fan failure. Returning to FIG. 1, in an embodiment, the server 130 is configured to generate an alert indicating the determined root-cause. In another embodiment, the server 130 is configured to group together alerts which have a common cause into one incident. In yet another embodiment, the server 130 is further configured to report any alert remaining after the root-cause analysis with additional information related to the associated incidence or incidences. That is, an alert would indicate the detected root-cause and would be reported with the associated incidence(s). This allows the user to drill down and better understand the problem potential solutions.

It should be noted that all incidence patterns are generated from machine-generated textual data which are automatically processed and classified into statistical metrics. For example, an error log reported by a load balancer (e.g., the load balancer 510-1, FIG. 5) may be: "Error(s) found in configuration file: /etc/haproxy/haproxy.cfg" and an error reported by an application server (e.g., one of the application servers 520, FIG. 5) may be: "Connection pool is full. discarding connection: [ConnectionName], path name: [PathName]" Thus, the sever 130 is configured to determine the root-cause of any incidence by merely processing input machine-generated textual data.

It should be understood that the embodiments disclosed herein are not limited to the specific architecture illustrated in FIG. 1, and other architectures may be equally used without departing from the scope of the disclosed embodiments. Specifically, the server 130 may reside in a cloud computing platform, a datacenter, and the like. Moreover, in an embodiment, there may be a plurality of classification servers operating as described hereinabove and configured to either have one as a standby, to share the load between them, or to split the functions between them.

Figure 6:
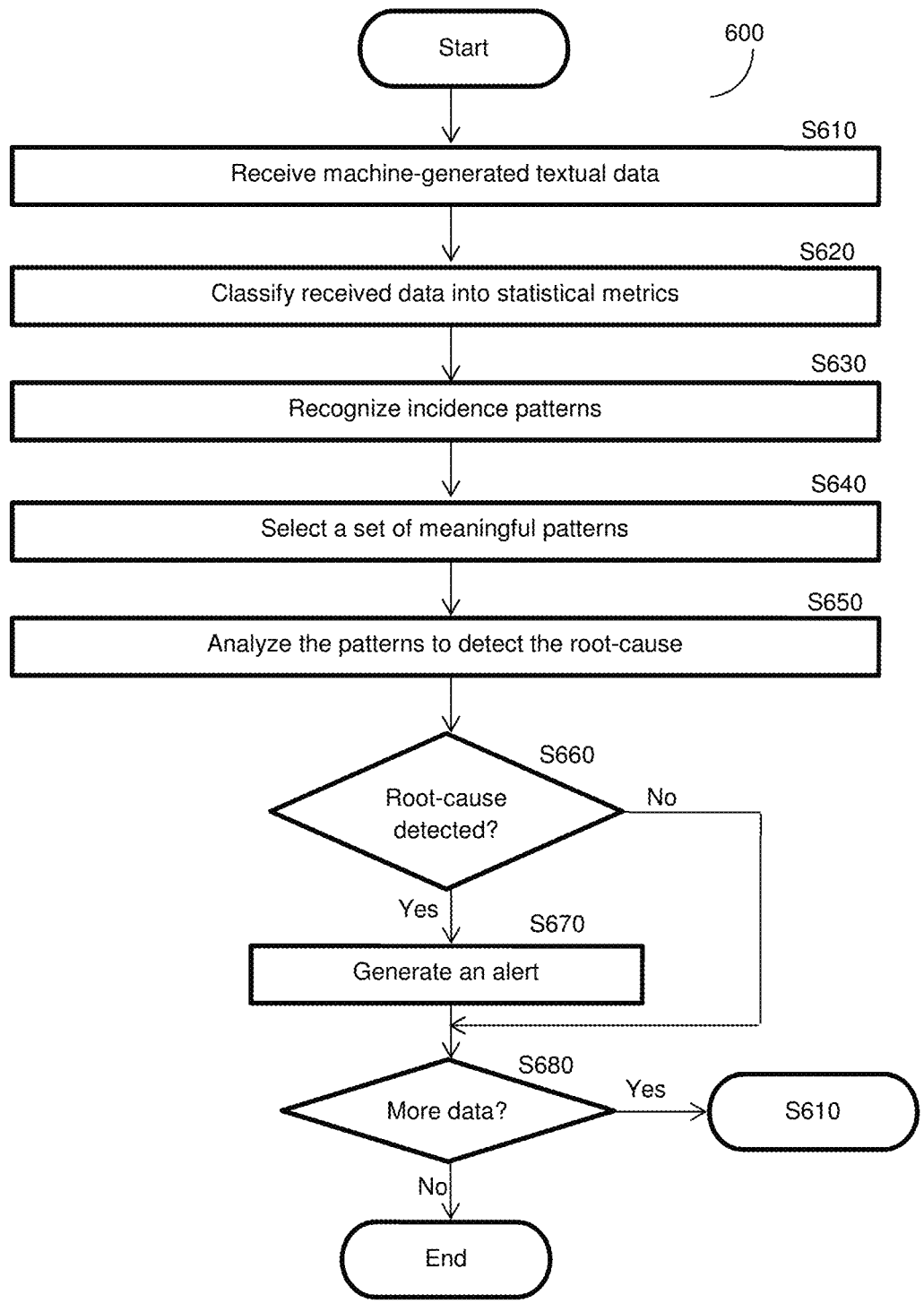
FIG. 6 is a flowchart illustrating a method for root-cause analysis of incidence using machine-generated textual data according to an embodiment.

FIG. 6 shows an example flowchart 600 of a method for determining a root-cause of an incidence based machine-generated textual data according to an embodiment. At S610, machine-generated textual data is received from a plurality of data sources. The machine-generated textual data may include, but is not limited to, application logs, configuration files, messages, spreadsheets, alerts, sensory signals, audit records, combinations thereof, and the like.

At S620, the received machine-generated textual data is classified into statistical metrics. As noted above, a statistical metric may include, but is not limited, a gauge, a meter, a histogram, and the like. In an embodiment, the classification process is performed as described in more detail in the above-referenced '272 Application.

At S630, the statistical metrics are processed to recognize incidence patterns. In an embodiment, S630 includes applying a past behavior of each incidence patterns to predict its future behavior. The incidence patterns may include, but are not limited to, new behavior, anomalous behavior, changes in routine operational, ongoing trends, and so on. As noted above, some techniques for recognizing incidence patterns that can be utilized according to the disclosed embodiments are discussed above.

At S640, a set of meaningful incidence patterns are selected or otherwise determined from among the recognized incidence patterns. A meaningful incidence pattern is an incidence pattern containing data (of a statistical metric) that can be utilized to determine a root-cause of an observed or unobserved incidence. Such meaningful patterns can be detected by considering the amplitude of a pattern, a frequency of a pattern, a similarity of a pattern to previously detected patterns, a number of detected same or similar patterns, or any combination thereof. For example, only incidence patterns that were previously observed are considered meaningful. In some embodiments, S640 is optional.

At S650, the determined meaningful incidence patterns are analyzed to identify any root-cause of an incidence (observed or unobserved). An observed incidence may be reported in an alert, while an unobserved incidence exists in the monitored environment but has not been discovered yet. In an embodiment, the monitored environment is any IT infrastructure and any computing resource included therein. Examples for such resources include network devices, computers, servers, software applications, software services, storage devices, storage networks, and the like. An incidence may be, for example, a failure or malfunction that negatively affects the operation of such a resource.

In an embodiment, the analysis includes correlating the incidence patterns (meaningful or not) using different correlation types. Such a correlation type may include time-proximity correlation, component-based (i.e., correlation of incidence patterns across different components), order-based (i.e., correlation of incidence patterns based on a certain order), or a combination thereof. The root-cause is determined based on the correlation type being utilized. The different correlation types are discussed in greater detail below and for the sake of the simplicity of the discussion are not repeated herein.

At S660, it is checked if a root-cause of an incidence is determined based on the analysis of the meaningful incidence patterns. If so, execution continues with S670, where an alert is generated and reported; otherwise, execution proceeds with S680. The generated alert indicates at least the determined root-cause. In another embodiment, any alert remaining after the root-cause analysis with additional information related to the associated incidence or incidences is also reported. At S680, it is checked if there are additional data logs to be processed; if so, execution returns to S610; otherwise, execution terminates.

Figure 7:
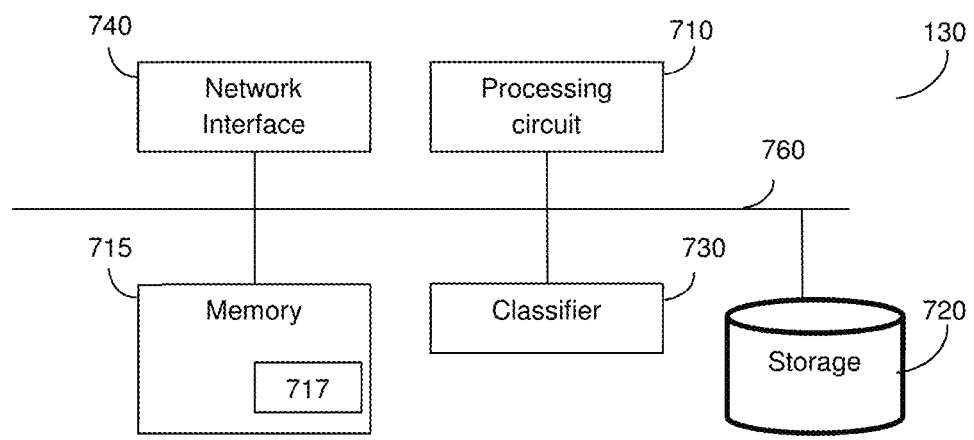
FIG. 7 is a block diagram of a server configured to carry out the various disclosed embodiments.

FIG. 7 shows an example block diagram of the server 130 implemented according to an embodiment. The server 130 includes a processing circuit 710 coupled to a memory 715, a storage 720, a classifier 730, and a network interface 740. In an embodiment, the components of the classification server 130 may be communicatively connected via a bus 760.

The processing circuit 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 715 may be volatile (e.g., RAM, etc.), non-volatile (e.g., ROM, flash memory, etc.), or a combination thereof. In one configuration, computer readable instructions to implement one or more embodiments disclosed herein may be stored in the storage 720.

In another embodiment, the memory 715 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuit 710 to perform the various processes described herein. Specifically, the instructions, when executed, configure the processing circuit 710 to determine root-cause of incidences based on machine-generated textual data. In a further embodiment, the memory 715 may further include a memory portion 717 including the instructions.

The storage 720 may be magnetic storage, optical storage, and the like, and may be realized, for example, as flash memory or other memory technology, CD-ROM, Digital Versatile Disks (DVDs), or any other medium which can be used to store the desired information. The storage 720 may store the received machine-generated textual data, events, metadata for events, events schema, various elements of each events, and/or the classification results.

The classifier 730 is configured to classify machine-generated textual data into metrics to enable systems to ingest, process, analyze, aggregate, and correlate the data by machines without scale or volume limitations. In an embodiment, processes performed by the classifier 730 may be performed as discussed in greater detail above, at least with respect to FIG. 6.

The network interface 740 allows the server 130 to communicate with the data sources 140 for the purpose of, for example, receiving machine-generated textual data. The server 130 can be utilized to output the classification results to external systems (not shown) for further processing. In an embodiment, the network interface 740 can allow interface with client devices to view the classification results and/or to configure the server 130.

It should be understood that the embodiments described herein are not limited to the specific architecture illustrated in FIG. 7, and that other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method implemented by a computer system for determining root-causes of incidences using machine-generated textual data, comprising:
   receiving, at the computer system, machine-generated textual data from at least one data source, at least some of the received data being unstructured data;
   classifying, by the computer system, the received machine-generated textual data into at least one statistical metric, wherein classifying the machine-generated textual data into statistical metrics further comprises:
      grouping the machine-generated textual data into a plurality of events;
      processing each event to determine a plurality of elements embedded therein;
      determining a type of each of the plurality of elements; and
      determining a statistical metric for each element based on at least the type of the element;
   processing, by the computer system, the statistical metric to recognize a plurality of incidence patterns;
   correlating, by the computer system, the plurality of incidence patterns to identify at least a root-cause of an incidence that occurred in a monitored environment; and
   generating, by the computer system, an alert indicating at least the identified root-cause, wherein generating the alert further comprises grouping a plurality of alerts into one incident, the plurality of alerts having the identified root cause in common;
   wherein the receiving, classifying, processing, correlating, and generating are performed without requiring any human interaction.

2. The method of claim 1, further comprising:
   selecting a set of incidence patterns from the plurality of recognized incidence patterns; and
   correlating the selected set of selected incidence patterns.

3. The method of claim 2, wherein selecting the set of incidence patterns is based on at least one of: an amplitude of an incidence pattern, a frequency of an incidence pattern, a similarity of an incidence pattern to previously detected incidence patterns, and a number of detected same or similar incidence patterns.

4. The method of claim 2, wherein the set of selected incidence patterns include incidence patterns having at least one similar entity.

5. The method of claim 4, further comprising:
   identifying the at least one entity in a first incidence pattern; and
   scanning a subset of the plurality of recognized incidence patterns to detect incidence patterns including the at least one entity, wherein the subset of the plurality of recognized incidence patterns occurred in a predefined time window prior to the first incidence pattern.

6. The method of claim 1, wherein each of the plurality of incidence patterns represents at least one of: a new behavior, an anomalous behavior, a routine operational change, a new trend, a changing trend, and an ongoing trend.

7. The method of claim 1, wherein correlating the plurality of incidence patterns to identify the at least a root-cause further comprises:
   determining the root-cause based on a correlation type being utilized.

8. The method of claim 7, wherein the correlation type is based on time-proximity.

9. The method of claim 8, further comprising:
   correlating at least two incidence patterns that occurred at the same or substantially the same time, wherein the root-cause is determined to be an incidence observed by an incidence pattern that occurred before other correlated incidence patterns.

10. The method of claim 7, wherein the correlation type is order-based.

11. The method of claim 10, further comprising:
   correlating at least two incidence patterns to identify at least one incidence pattern trended to at least an increased severity, wherein the root-cause is determined to be an incidence observed by the least one trended incidence pattern.

12. The method of claim 7, wherein the correlation type is component-based.

13. The method of claim 12, further comprising:
correlating incidence patterns across different components to identify a component that includes a single broken element, wherein the root-cause is determined to be an incidence observed by an incidence pattern of the single broken element, wherein each of the different components includes a plurality of elements.

14. The method of claim 1, wherein each statistical metric is any one of: a gauge, a meter, and a histogram.

15. The method of claim 1, wherein the machine-generated textual data includes at least one of: application logs, configuration files, alerts, sensory signals, audit records, and combinations thereof.

16. The method of claim 1, wherein the monitored environment is an information technology (IT) infrastructure.

17. The method of claim 1, wherein determining the statistical metric for each element further comprises:
determining a type of the statistical metric that allows for statistically measuring a value of the respective element.

18. A non-transitory computer readable medium having stored thereon instructions for causing a computer system to execute a process for determining cause root of incidences using machine-generated textual data, the process comprising the steps of:
receiving at the computer system machine-generated textual data from at least one data source, at least some of the received data being unstructured data;
classifying, by the computer system, the received machine-generated textual data into at least one statistical metric, wherein classifying the machine-generated textual data into statistical metrics further comprises:
grouping the machine-generated textual data into a plurality of events;
processing each event to determine a plurality of elements embedded therein;
determining a type of each of the plurality of elements; and
determining a statistical metric for each element based on at least the type of the element;
processing, by the computer system, the statistical metric to recognize a plurality of incidence patterns;
correlating, by the computer system, the plurality of incidence patterns to identify at least a root-cause of an incidence that occurred in a monitored environment; and
generating, by the computer system, an alert indicating at least the identified root-cause, wherein generating the alert includes grouping a plurality of alerts into one incident, the plurality of alerts having the identified root cause in common;
wherein the receiving, classifying, processing, correlating, and generating are performed without requiring any human interaction.

19. A system for determining root-causes of incidences using machine-generated textual data, comprising:
a processing circuit;
a memory communicatively connected to the processing circuit, wherein the memory contains instructions that, when executed by the processing element, configure the processing circuit to:
receive at the system machine-generated textual data from at least one data source;
classify by the system the received machine-generated textual data into at least one statistical metric, wherein the system is further configured to:
group the machine-generated textual data into a plurality of events;
process each event to determine a plurality of elements embedded therein;
determine a type of each of the plurality of elements; and
determine a statistical metric for each element based on at least the type of the element;
process by the system the statistical metric to recognize a plurality of incidence patterns;
correlate by the system the plurality of incidence patterns to identify at least a root-cause of an incidence that occurred in a monitored environment; and
generate by the system an alert indicating at least the identified root-cause, wherein the system is further configured to group a plurality of alerts into one incident, the plurality of alerts having the identified root cause in common;
wherein the system operates without requiring any human interaction.

20. The system of claim 19, wherein the method further configured to:
select a set of incidence patterns from the plurality of recognized incidence patterns; and
correlate the selected set of selected incidence patterns.

21. The system of claim 20, wherein the selection of the set of incidence patterns is based on at least one of: an amplitude of an incidence pattern, a frequency of an incidence pattern, a similarity of an incidence pattern to previously detected incidence patterns, and a number of detected same or similar incidence patterns.

22. The system of claim 21, wherein the monitored environment is an information technology (IT) infrastructure.

23. The system of claim 20, wherein the machine-generated textual data includes at least one of: application logs, configuration files, alerts, sensory signals, audit records, and combinations thereof.

24. The system of claim 19, wherein each of the plurality of incidence patterns represents at least one of: a new behavior, an anomalous behavior, a routine operational change, a new trend, a changing trend, and an ongoing trend.

25. The system of claim 19, wherein correlating the system is further configured to:
determine the root-cause based on a correlation type being utilized.

26. The system of claim 25, wherein the correlation type is based on time-proximity.

27. The system of claim 26, wherein the system is further configured to:
correlate at least two incidence patterns that occurred at the same or substantially the same time, wherein the root-cause is determined to be an incidence observed by an incidence pattern that occurred before other correlated incidence patterns.

28. The system of claim 25, wherein the correlation type is order-based.

29. The system of claim 28, wherein the system is further configured to:
correlate at least two incidence patterns to identify at least one incidence pattern trended to at least an increased severity, wherein the root-cause is determined to be an incidence observed by the least one trended incidence pattern.

30. The system of claim 25, wherein the correlation type is component-based.

31. The system of claim 30, wherein the system is further configured to:
  correlate incidence patterns across different components to identify a component that includes a single broken element, wherein the root-cause is determined to be an incidence observed by an incidence pattern of the single broken element, wherein each of the different components includes a plurality of elements.

32. The system of claim 19, wherein each statistical metric is any one of: a gauge, a meter, and a histogram.

* * * * *